Figure 1:
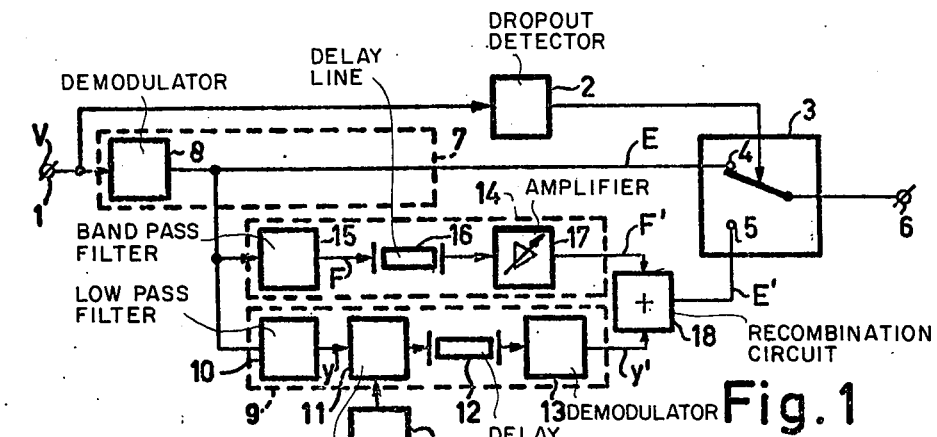

United States Patent [19]

Kenney et al.

[11] 4,032,966

[45] June 28, 1977

[54] DROP OUT COMPENSATION DEVICE

[75] Inventors: George Churchill Kenney, Briarcliff Manor, N.Y.; Adrianus Huibert Hoogendijk, Eindhoven, Netherlands

[73] Assignees: U.S. Philips Corporation; North American Philips Corporation, both of New York, N.Y.

[22] Filed: Sept. 10, 1975

[21] Appl. No.: 612,251

[30] Foreign Application Priority Data

May 30, 1975 Netherlands ............... 7506411

[52] U.S. Cl. ............................................ 358/8
[51] Int. Cl.² ........................................ H04N 5/76
[58] Field of Search ............... 358/8; 360/38; 178/6.6 DC

[56] References Cited

UNITED STATES PATENTS

| | | | |
|---|---|---|---|
| 3,463,874 | 8/1969 | Hodge et al. | 358/8 |
| 3,755,621 | 8/1973 | Dillenburger et al. | 358/8 |
| 3,824,620 | 7/1974 | Langer | 360/38 |
| 3,925,811 | 12/1975 | Kenney | 358/8 |

*Primary Examiner*—Robert L. Griffin
*Assistant Examiner*—Aristotelis M. Psitos
*Attorney, Agent, or Firm*—Frank R. Trifari; Simon L. Cohen

[57] ABSTRACT

A device for compensating dropouts in color television signal modulated by a carrier wave. The modulated video signal is applied to a first delay line, from whose output signal a luminance component delayed by one line period is derived with the aid of a demodulator, and is also applied through a second demodulator and a chrome separating filter to a second one line delay line. The sum of the delayed chrominance and luminance components are substitution for the demodulated color television signal during a dropout.

1 Claim, 3 Drawing Figures

DROP OUT COMPENSATION DEVICE

The invention relates to a dropout compensation device for the compensation of signal dropouts in a video signal, which signal comprises a color television signal with a luminance and a chrominance component, which color television signal is modulated on a carrier wave, which device comprises an input terminal for receiving a video signal, a first circuit coupled to said input terminal, including a demodulator for supplying a demodulated color television signal, a second circuit adapted to supply a luminance component of the color television signal delayed by substantially one line period with the aid of a first delay means, a third circuit adapted to derive a chrominance component delayed by substantially one line period from the demodulated color television signal with the aid of a second delay means, a recombination circuit for recombining the luminance component supplied by the second circuit and the chrominance component supplied by the third circuit, and a switching means controlled by a dropout detector, which means is adapted to normally transfer the color television signal supplied by the first circuit to an output terminal and during a signal dropout transfer the signal supplied by the recombination circuit.

The invention in particular relates to a device for the compensation of signal dropouts in a video signal, which is read from a record carrier, for example a record carrier, a tape or disk. With such record carriers flaws in the recording medium may give rise to interruptions or deviations in the read-out signal, which are generally thermed signal dropouts.

The invention further in particular relates to a device for the compensation of signal dropouts in a video signal which consists of a color television signal which is modulated on a carrier wave, which color television signal comprises a luminance and chrominance component, which two components are thus modulated on a common carrier wave. In this respect it is obvious that first of all a color television signal is considered which is in accordance with an existing standard, in particular the NTSC standard, which is modulated directly, i.e. without further transformation, onto a carrier wave.

A device of the type mentioned in the preamble is known from U.S. Pat. No. 3,463,874. In said known device the color television signal, which is added to a carrier wave as a frequency modulation, is demodulated and normally transferred to the output terminal via the first circuit. Further, this demodulated color television signal is applied to the second and the third circuit, which two circuits derive therefrom a luminance and chrominance component delayed by one period, which two components are recombined in the recombination circuit and during a signal dropout are applied to the output terminal as a substitute signal. Care is then taken that the delay realized in the third circuit is essentially not exactly one line period, but has a deviation of half a period of the chrominance carrier wave with respect to said line period. Thus it is automatically achieved that the chrominance component inserted during a signal dropout has the correct color phase, which color phase changes every line in an NTSC standard color television signal.

In said known devices a problem occurs if for the delay means required in the second circuit use is to be made of so-called ultrasonic delay lines, i.e. delay lines in which the applied electrical signal is converted into an ultrasonic wave, after which travelling through a generally vitreous medium is re-converted into a delayed electrical signal. In the present state of the art the delay line is not capable of handling very low frequencies. However, the luminance component to be delayed in the second circuit has a frequency spectrum which extends to zero frequency and hence it cannot be supplied directly to such a delay line. Therefore, when such a delay line is used in said known device, this luminance component is first amplitude-modulated on a carrier wave, subsequently delayed and then demodulated again. This means that to avoid the above-mentioned problem said known device requires an additional modulator, a carrier-wave oscillator and a demodulator.

It is an object of the invention to avoid this problem in a much simpler and cheaper manner and the invention is therefore characterized in that the second circuit is adapted to receive the video signal directly and includes a demodulator for demodulating the luminance component of the delayed video signal.

The invention makes highly effective use of the fact that the read-out video signal as such occupies a limited frequency band around the carrier wave, which does not comprise extremely low frequencies at any rate. This read-out video signal may therefore readily be applied to a first delay line of the above mentioned type. Furthermore, as in fact this first delay line merely serves to correctly transmit the luminance component of the color television signal, while the chrominance component is delayed with the aid of a second delay line which receives a signal derived from the demodulated color television signal, the advantage is retained that owing to the separate processing of the luminance and the chrominance component the requirements imposed on the two delay lines are limited and the risk of undesired phase shifts, in particular with respect to the chrominance component, is minimal.

Figure 2:
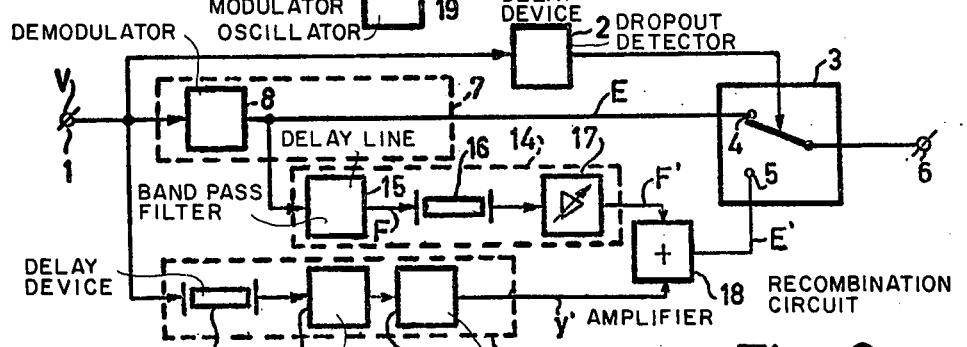
Figure 3:
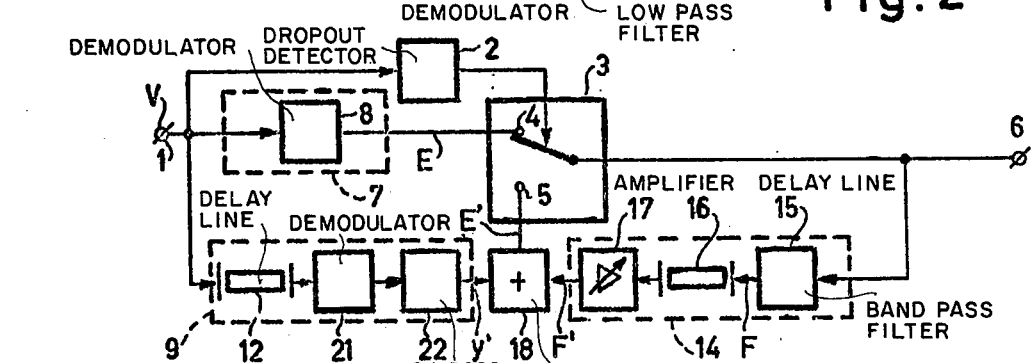
Figure 4:
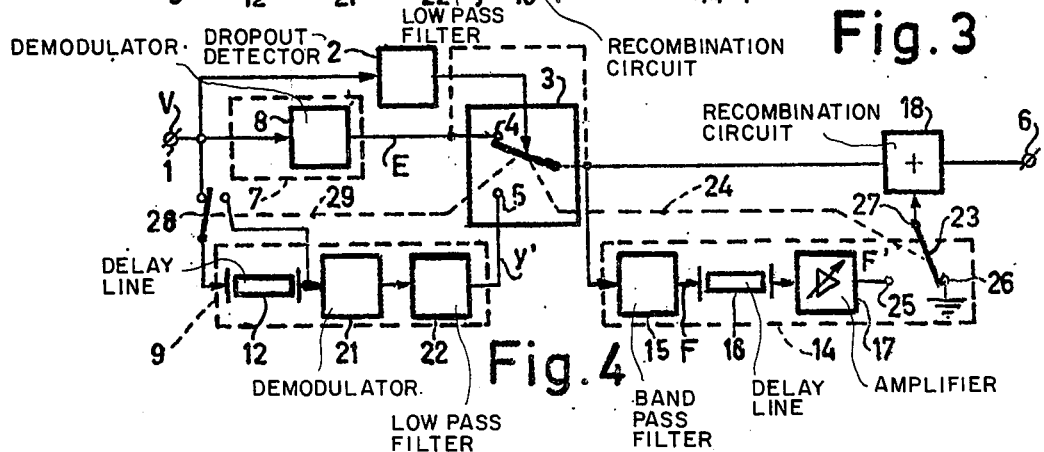

The invention will be described in more detail with reference to the drawing, in which FIG. 1 shows an embodiment of the known device, and FIGS. 2 through 4 show three embodiments of the device according to the invention.

The known device of FIG. 1 comprises an input terminal 1, to which the video signal V which is read from the record carrier is applied. Said video signal V consists of a color television signal E with a luminance and a chrominance component which signal is modulated on a carrier wave, generally frequency modulated. In the case of a so-termed "direct system" the color television signal is a standard color television signal, for example in accordance with the NTSC standard.

Said video signal V is applied to a first circuit 7, which is included between the input terminal 1 and a first input 4 of a switching means 3. Said first circuit comprises a demodulator 8, at whose output the demodulated color television signal E is available. In the case of a "direct system" this is a standard color television signal, which is then normally applied to the output terminal 6 via the switching means 3.

The switching means 3 is controlled by a dropout detector 2, which is connected to the input terminal 1 and which normally maintains the switching means 3 in the position shown and only during the occurrence of a signal dropout in the video signal which is applied to the terminal 1 sets said switching means to the position in which the second input 5 is coupled to the output terminal 6. Upon the occurrence of such a dropout a compensation signal E' is applied to the output terminal 6 via said switching means 3, which compensation signal is derived from the video signal of the preceding line of the recorder television picture.

Said compensation signal E' is obtained with the aid of two circuits 9 and 14 and a recombination circuit 18. The two circuits 9 and 14 are connected to the output of the demodulator 8 and are adapted to supply a luminance component Y' and chrominance component F' respectively, delayed by one line period. The circuit 9 therefore first of all includes a low-pass filter 10 for extracting the luminance component Y from the demodulated color television signal E. Furthermore, said circuit 9 includes a delay means 12 for delaying said luminance component Y by one line period.

However, in order to enable for example an ultrasonic delay line to be used for said delay means 12, it is necessary to transpose the extracted luminance component Y first to a frequency band, which in any case does not contain the frequency zero. For this purpose, a modulator 11 precedes the delay line 12, which modulator receives a carrier wave from an oscillator 19, and modulates the luminance component Y on said carrier wave. The signal which is modulated on said carrier wave is subsequently delayed by one line period by the delay line 12, after which with the aid of a demodulator 13 the luminance component Y' delayed by one line period is obtained from said modulated delayed signal.

The circuit 14 comprises a band-pass filter 15 for extracting the chrominance component F from the demodulated standard color television signal E. As said chrominance component F occupies a limited frequency band around the standard chrominance carrier wave, said chrominance component may be applied directly to an ultrasonic delay line 16, which delays said chrominance component by one line period. Said delay line is finally followed by a variable amplifier and phase inverter 17. In the case of an NTSC standard color television signal said phase inverter inter alia serves to ensure that the phase of the delayed chrominance component F' is opposed to the phase of the chrominance component F. This is necessary, because in an NTSC standard color television signal said color phase changes every line as has been extensively described in the cited U.S. Pat. No. 3,463,874.

The signal components F' and Y' supplied by the two circuits 9 and 14 are recombined by the recombination circuit 18 to a compensation signal E', which is applied to the input 5 of the switching means 3 and thus during a dropout takes place of the disturbed signal E.

FIGS. 2 to 4 show three embodiments of the device according to the invention, corresponding elements being denoted by the same reference numerals as in FIG. 1.

The embodiment of FIG. 2 largely corresponds to the device of FIG. 1. The essential difference is that the circuit 9 for obtaining the luminance component Y' which is delayed by one line period does not receive the demodulated color television signal E, but is directly coupled to the input terminal 1. This has far-reaching consequences. As the video signal V applied to said input terminal 1 consists of a color television signal which is modulated on a carrier wave, said video signal, in contradistinction to the demodulated luminance component Y, is suited to be applied to an ultrasonic delay line. This means that the delay line 12 in said circuit 9 may be coupled directly to said input terminal and a video signal delayed by one line period is available at its output.

For this, the delay line 12 need not have a bandwidth which covers the full bandwidth of the video signal, but only the bandwidth of the luminance component which is modulated on the carrier wave, for the circuit 9 merely needs to supply the luminance component Y'. Said luminance component Y' is now obtained by demodulating the delayed output signal of the delay line 12 with the aid of a demodulator 21, which may be identical to the demodulator 8, and by extracting said luminance component Y' from the demodulated signal with the aid of the low-pass filter 22.

A comparison of FIGS. 1 and 2 directly reveals that by the step according to the invention a substantial reduction of the required number of electronic elements in the circuit 9 is achieved.

The embodiment of the device according to the invention shown in FIG. 3 fully corresponds to the embodiment of FIG. 2 in respect to the circuits 8 and 9, the switching means 3 and the recombination circuit 18. The embodiment of the circuit 14 as such is also identical. However, in contradistinction to FIG. 2 the input signal for said circuit 14 is now taken from the output terminal 6, which makes no essential difference with respect to the operation of the device.

In the embodiment of FIG. 4 only the delayed luminance component Y' is applied to the second input 5 of the switching means 3. The recombination circuit 18 is now included between the output of said switching means 3 and the output terminal 6. The input signal for the circuit 14 is also taken from the output of said switching means 3 or, as is shown dashed, from the output of the demodulator 8. In said circuit 14 an additional switch 23 is included with a first input 25 which is connected to the amplifier and phase inverter 17, a second input 26, which is at ground potential, and an output 27 which is connected to the recombination circuit 18. Said switch 23 is coupled to the switching means 3, which is indicated by the dashed line 24.

Normally, the two switches 3 and 23 are in the position shown. As the recombination circuit 18 then receives no signal from the switch 23 the demodulated color television signal E will be available at the ouput terminal 6. Upon occurrence of a signal dropout said recombination circuit 8 receives the delayed luminance component Y' via the circuit 9 and the switching means 3, and the delayed chrominance component F' via the circuit 14 and the switch 23, which two components are then combined.

With respect to the specific embodiment of the device according to the invention, it is evident that various obvious further modifications and extensions are possible. For example, it is evident that the device as such is not capable of compensating for a dropout longer then one line period or for a signal dropout which occurs exactly one line period after a previous dropout, because than no suitable compensation signal is available. In respect of the luminance component this may be remedied by including an additional switch 28 before the delay means 12, which switch has coupled to the switch 3, which is denoted by the dashed line 29 in FIG. 4. With the aid of said switch 28 the output of the delay line 12 is connected to its input upon the occurrence of a dropout, so that a closed loop system is obtained. Of course, an amplifier should be included in the feedback circuit, in order to compensate for the attenuation of the delay line. It is obvious that a similar step may be employed with respect to the chrominance component by circulating the signal in the delay line 16. In the embodiment of FIG. 4 it is also possible not to coupled the switch 23 directly to the switch means 3, but via a logic circuit with a delay of one line period. Said logic circuit should then block said switch 23 in the shown position during a time interval, which occurs one line period after a signal dropout. In the event that within this time interval another dropout occurs, the color television signal at the output terminal 6 in any case will not exhibit an incorrect color, but the colour is suppressed. The same may of course also be achieved in the other embodiments, by including a switch in the circuit 14, which switch during said time interval reduces the output signal of said circuit to zero.

Finally, it will be evident that in general it will be necessary to include additional delay networks in certain circuits in order to adapt the transit times in the various circuits to each other.

What is claimed is:

1. A drop-out compensation device for compensating for drop-outs in a modulated color television video signal, comprising a first demodulator having an input terminal connected to the input of said compensation device for converting said video signal into a demodulated composite luminance-chroma signal, a first filter means connected to an output of said first demodulator for separating the chroma from said composite demodulated signal, a first delay line connected to an output of said first filter means for delaying said chroma signal by one television line period, a second delay line connected to the input terminal of the compensation device and to the input of said first demodulator for delaying the modulated color television signal by one television line, a second demodulator connected to an output of said second delay line for demodulating said delayed video signal, second filter means connected to an output of said second demodulator for separating said luminance signal from said delayed modulated video signal, a drop-out detector connected to the input of said compensating device for providing a drop-out detection signal, an output terminal for said compensation device, and an output summing and switching circuit means connected to the output terminal of said compensation device, to the drop-out detector, to the first demodulator, to said first delay line and to said second filter means for providing the output of said first demodulator to said compensation device output terminal in the absence of a drop-out detection signal and for providing a signal corresponding to the sum of the output signals from said first delay line and said second filter means is response to the presence of a drop-out detection signal.

* * * * *